United States Patent
Wuest et al.

(10) Patent No.: US 12,298,863 B2
(45) Date of Patent: May 13, 2025

(54) SYSTEM AND METHOD FOR AUTOMATED DYNAMIC PENETRATION TESTING ON ACTIVE BACKUP SYSTEM

(71) Applicant: Acronis International GmbH, Schaffhausen (CH)

(72) Inventors: Candid Wuest, Bassersdorf (CH); Philipp Gysel, Bern (CH); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 45 days.

(21) Appl. No.: 18/193,316

(22) Filed: Mar. 30, 2023

(65) Prior Publication Data

US 2024/0330123 A1    Oct. 3, 2024

(51) Int. Cl.
*G06F 11/14* (2006.01)
*G06F 21/57* (2013.01)

(52) U.S. Cl.
CPC ........ *G06F 11/1466* (2013.01); *G06F 21/577* (2013.01)

(58) Field of Classification Search
CPC ............................ G06F 11/1466; G06F 21/577
USPC .......................................................... 707/640
See application file for complete search history.

(56) References Cited

U.S. PATENT DOCUMENTS

| | | | |
|---|---|---|---|
| 9,229,845 B1 * | 1/2016 | Chandrasekharapuram | G06F 11/3692 |
| 9,329,915 B1 * | 5/2016 | Chandrasekharapuram | G06F 11/00 |
| 9,710,367 B1 * | 7/2017 | Nagineni | G06F 11/3684 |
| 9,946,619 B1 * | 4/2018 | McClintock | G06F 11/1464 |
| 10,417,115 B1 * | 9/2019 | Klein | G06F 9/45512 |
| 11,100,217 B1 * | 8/2021 | Natanzon | H04L 41/0869 |
| 11,269,699 B2 * | 3/2022 | Mi | G06F 9/45504 |
| 11,321,461 B2 | 5/2022 | Mungre et al. | |
| 11,341,032 B1 * | 5/2022 | Abrams | G06F 11/3664 |

(Continued)

FOREIGN PATENT DOCUMENTS

| | | |
|---|---|---|
| CN | 102200944 B | 12/2014 |
| CN | 109460331 B | 10/2021 |
| GB | 2532076 A | 5/2016 |

OTHER PUBLICATIONS

Acronis Security Services (datasheet), @ 2002-2020 Acronis International GmbH https://dl.acronis.com/u/rc/DS_Acronis_Cyber_Services_EN-US_200908.pdf.

(Continued)

*Primary Examiner* — Joshua Bullock
(74) *Attorney, Agent, or Firm* — ESPE Legal Consultancy FZ-LLC (57) ABSTRACT

Systems and methods for verifying a production system automatically by testing a backup copy of the production system. The system comprises a backup transporter configured to copy or move a set of backup files from the backup generated of the production system and replicate the set of files on a testing computer, a mounting module configured to instantiate a copy of the production system on the testing computer, and a testing module configured to apply a set of automatic pre-defined tests to the application on the testing computer to analyze the application for vulnerabilities and defects, and generate a list of results of execution of each of the pre-defined tests on the testing computer, the list of results indicative of the vulnerabilities and defects.

20 Claims, 3 Drawing Sheets

(56) References Cited

U.S. PATENT DOCUMENTS

| | | |
|---|---|---|
| 11,394,738 B2 | 7/2022 | Kulaga et al. |
| 2016/0132420 A1* | 5/2016 | Kuo .................... G06F 9/45558 717/130 |
| 2022/0091940 A1 | 3/2022 | Kumar et al. |

OTHER PUBLICATIONS

Acronis Security Services (article in the Knowledge Base), https://kb.acronis.com/content/63204, Sep. 28, 2020.

What goes into a strong, modern cyber protection stack (Acronis Blog), https://www.acronis.com/en-us/blog/posts/what-goes-strong-modern-cyber-protection-stack/, May 20, 2021 Amy Luby.

Cyber Threat Intelligence and Monitoring (Acronis Blog), https://www.acronis.com/en-eu/blog/posts/cyber-threat-intelligence/, Nov. 16, 2022.

* cited by examiner

Method 300

```
copying a set of files from comprising a backup of the production system and
replicating the set of files on a testing computer 302
```

```
mounting an copy of production system on the testing computer, wherein the system
corresponds to the replicated set of files 304
```

```
applying a set of pre-defined tests to the copy of the production system on the testing
computer 306
```

```
generating a list of results of execution of each of the pre-defined tests on the testing
computer 308
```

FIG. 3

SYSTEM AND METHOD FOR AUTOMATED DYNAMIC PENETRATION TESTING ON ACTIVE BACKUP SYSTEM

TECHNICAL FIELD

The present disclosure generally relates to information system security and active protection of information system security. In particular, the present disclosure relates to systems and methods for automated dynamic penetration testing on active backups of a production system.

BACKGROUND

Production systems can be updated by the users or other processes of the system in the form of documents with executable capability, scripts or programs executable by components of that system, as well as additional functionality provided by virtual environments. These updates cannot be verified by simply scanning the production system's file storage. In some cases, additional functions are added to a production system by different development organizations or come from different sources, which makes the testing phase of the formal software release process difficult.

Under these circumstances, a need arises to test the production system after it has been deployed to production. However, the application of existing tests to the production system may affect the system's availability, as some of the tests are designed to be destructive (for example, load and penetration tests). Still other tests may identify defects that can lead to unforeseen conditions which are undesirable in a production environment.

Therefore, there is a need for systems and methods that can validate constantly changing production systems by testing the capabilities of the production system without jeopardizing the security of that production system.

SUMMARY

Embodiments described herein meet the aforementioned needs of the industry. The present disclosure relates to systems and methods for verifying the functionality of a production system by testing a backup of the production system.

In accordance with an embodiment, a method for verifying a production system by testing a live backup of the production system on a testing computer includes copying or moving a set of files comprising a backup of the production system and replicating the set of files on a location accessible by the testing computer, instantiating a copy of production system on the testing computer to create the live backup, wherein the system corresponds to the set of files comprising the backup of the production system, applying a set of predefined dynamic automatic tests to the live backup on the testing computer, generating a list of results of execution of each of the predefined automatic tests on the testing computer; and saving the list of results on a computer memory or communicating this list to a user.

For dynamic testing, the system is instantiated, in other words, it is not enough to simply test a storage of files that reflect the system. Rather, instructions stored in the files reflective of the system are executed and the system is accordingly live. The production system is represented by the replicated set of backup files.

In contrast to traditional methods for evaluating a computer system, which typically include static scanning of a storage of files without executing these files, embodiments described herein utilize dynamic testing of the system such that the prerequisite to start such testing is to instantiate the system under test, or make it live. Dynamic tests, including dynamic scanning such as vulnerability scanning for example, of IP ports, are tests that evaluate the functionality of the system through different interactions with it.

In an embodiment, a method further includes generating the backup of the production system when the production system is live.

In an embodiment, the production system is stopped or paused before generating the backup and the production system is re-started after the backup is completed.

In an embodiment, testing comprises penetration testing.

In an embodiment, a method further includes delivering the generated list of results to stakeholders by at least one of sending an electronic communication, displaying on a display unit of a stakeholder's computer, printing in a print media, or publishing in electronic media.

In an embodiment, a method further includes collecting the generated list of results from each iteration of the testing and storing the collected lists in a file or a database.

In an embodiment, a method further includes performing testing the backup of the production system, wherein the testing the backup of the production system is conducted by an automated testing system having a local testing agent installed onto the computer where a backup of the production system was mounted before the scanning is performed.

In an embodiment, the production system is at least one of: a virtual machine, a container, a scripting engine, or a web server.

In an embodiment, a method further includes comparing a current generated list of results with a list of results corresponding to one or more previous backups of the production system and other production systems, identifying differentiating factors which are indicative of vulnerabilities, and highlighting and communicating the differentiating factors to a user.

In an embodiment, a method further includes tracking at least one emerging new threat or vulnerability as detected by threat intelligence collected from at least one source and new common vulnerabilities and exposures reported, and revising at least one pre-defined test for scanning the backup of the production system in a testing environment.

In an embodiment, a system for automatically verifying a production system by testing a live backup copy of the production system includes a backup transporter configured to copy a set of files from the backup of the production system, and replicate the set of files on a testing computer, a mounting module configured to instantiate a copy of the production system on the testing computer from the backup files to create the live backup copy, a testing module configured to apply a set of predefined automatic tests to the mounted set of files on the testing computer to analyze the production system for vulnerabilities detection, and generate a list of results of execution of each of the predefined automatic tests on the testing computer, wherein the list of results is indicative of the vulnerabilities present on the production system.

In an embodiment, a system further includes a backup system to generate the backup of the production system when the production system is live.

In an embodiment, the production system is at least one of: a virtual machine, a virtual environment, a container, a scripting engine, or a web server.

In an embodiment, a system further includes a communication module to deliver the generated list of results to stakeholders by at least one of sending an electronic communication, displaying on a display unit of a stakeholder's computer, printing in a print media, or publishing in electronic media.

In an embodiment, the system is isolated from a communication network, wherein the communication network includes a wired network or a wireless network.

In an embodiment, the system is connected with partial filtering, and wherein the system is connected without filters applied on the testing computer.

In an embodiment, the partial filtering is performed based on a set of filtering rules, and wherein the filtering rules are generated by at least one of the following modes: manually, through heuristics, or through Artificial Intelligence or Machine Learning Algorithms based on historical data and data collected from at least one similar system.

In an embodiment, the testing module is further configured to collect the generated list of results from each iteration of the testing and store the collected lists for later use.

In an embodiment, the testing module is further configured to: compare a current list of results with a list of results corresponding to one or more previous backups of the production system and at least one other production system, identify differentiating factors which are indicative of vulnerabilities, and highlight and communicate the differentiating factors to a user.

In an embodiment, the testing module is further configured to track at least one emerging new threat or vulnerability as detected by threat intelligence collected from at least one source and new common vulnerabilities and exposures reported and revise at least one pre-defined test for scanning the backup of the production system in a virtual environment.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

The present disclosure presents systems and methods to verify the production system by testing the backup of the production without having to deactivate IDS tools or interrupt the production system.

With the proliferation of digitization, information system security and the correct functionality of production systems have become critical aspects to protect software applications from malicious attacks or failures caused by threat agents or events. Moreover, as the amount of data contained within the application or the number of users increases, embodiments further effectively handle computational load, load balancing, or handling spikes in user or computational activity.

Embodiments described herein utilize automatic testing, such as dynamic penetration tests, SQL, scripting, and HTML injection tests, load, and stress testing on the system in the testing environment. Automatic testing identifies, among other things, if the current hardware configuration is sufficient to cater the application's operational requirements and if corrective action is necessary to mitigate the misconfiguration before the application is exploited by attackers.

Automatic tests are designed to test the system above and beyond the normal functionality and defense mechanisms of the system in order to detect potential vulnerabilities and defects. As such, embodiments described herein can test the production system without causing failure of the production system, and without interruptions in the production environment.

Further, because systems in production are constantly changing (e.g. increase or change of the user load), as the number of users accessing the system grows, the amount of information stored within that system increases, the data transferred between internal and external system components becomes higher. Embodiments are therefore able to handle constantly-changing production systems.

Further, many systems act as scripting engines. For example, in many cases, web servers accept scripting files that add functionality exposed through these web servers and which do not even need to be compiled. The addition of executable code to the web server changes the functionality profile of the system that contains that web server. Other scripting engines include the ability to execute Batch files, such as on Windows and Linux-Shell scripts.

A separate class of dynamic additions to the systems are virtual environments, virtual machines, and containers. These can be added to the system as collections of files and later be instantiated as full-blown computers with their own functionality and storage. Embodiments are therefore able to handle all of the aforementioned production environments.

Figure 1:
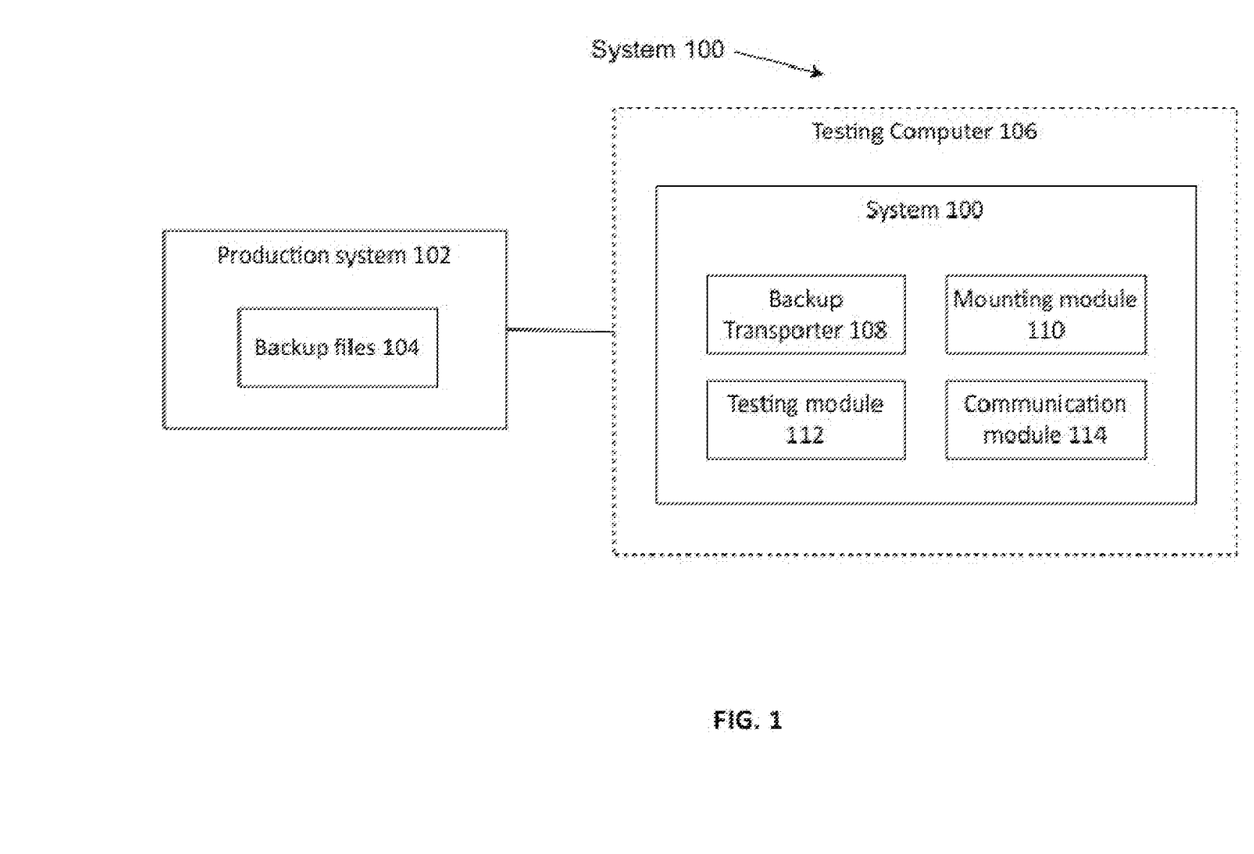
FIG. 1 is a block diagram of a system for verifying functionality of a production system, in accordance with an embodiment.

Referring to FIG. 1, a block diagram of a system 100 for verifying functionality of a production system is depicted, in accordance with an embodiment. The system 100 is configured to perform automated testing of a copy of the production system 102. In an embodiment, the production system 102 is a tool implemented to provide functionality to plan and execute projects from beginning to end, while automating the material planning, production tracking and scheduling, and product lifecycle management. For example, the projects or products can be a software project and a software product. In an embodiment, the production system 102 has one or more software projects in a planning or execution state concurrently. In an embodiment, the production system 102 comprises a virtual machine, a container, a scripting engine with scripts, or a web server with executable binary or scripting code.

One or more activities performed on the production system 102 can be recorded in the backup files 104. For example, each activity associated with any live project can be recorded in the backup files 104. In an embodiment, the production system 102 itself makes a copy of the files, folders, data of each project in a backup memory. In an embodiment, the backup files 104 includes the operating system files 100, application files, and data as such that by using the backup files 104, a virtual project can be created and executed. In one embodiment, the backup is created as a system full backup and routinely updated on a backup storage with incremental backups.

In an embodiment, the system 100 is configured to access the backup files 104 of the production system 102 and perform automatic testing on the backup files 104. In an embodiment, the system 100 is implemented on a testing computer 106. In an embodiment, the testing computer 106 is a portable electronic device such as a smartphone, tablet, single board computer, smart device, a laptop, a stationary unit such as a personal desktop computer, or a virtual computer.

In an embodiment, the system 100 comprises a backup transporter 108, a mounting module 110, and a testing module 112.

The system includes various engines or modules, each of which is constructed, programmed, configured, or otherwise adapted, to autonomously carry out a function or set of functions. The term engine or module as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

According to an embodiment, the backup transporter 108 is a component responsible for storing and retrieving backups. In an embodiment, the backup transporter 108 is configured to copy the backup files 104 from one local system 100 to another system 100, from one system 100 to one server, from one server to one system 100, or from one server to another server. In an embodiment, the backup transporter 108 is configured to copy backup files 104 from production system 102 and replicate the backup files 104 on the testing computer 106. In an embodiment, the system 100 has a local storage to store the backup files 104. In another embodiment, the backup files 104 are stored on a remote storage or a server connected to the system 100, and by retrieving the backup files 104, a copy of the production system 102 can be created.

In an embodiment, the backup of the production system 102 is generated when the production system 102 is live. Further, the latest backup of the production system 102 is copied as a copy of the production system 100. The copy of the production system 100, replicating the production system 102, is then started and made available for testing. In an embodiment, the copy of the production system 100 is started in the cloud and then made available for testing.

In another embodiment, the system 100 is connected to the production system 102 through a network system 100, and backup of the production system 102 is generated by the system 100. The generated backup is then shared with the mounting module 110 to mount the production system 102 for testing.

In an embodiment, the backup transporter 108 is configured to generate multiple backups. For example, the backup transporter 108 is further configured to copy backup files from multiple production systems and replicate the backup files on the testing computer 106. For example, all production systems in an organization (for example, on a same network) can be recreated.

In an embodiment, the transporter 108 is configured to use filtering in the process of generating a backup. For example, the system files of the operating system can be excluded from the backup creation process. In another example, the executable modules of a software product that is a part of the version management process centrally managed within an organization are excluded from the backup creation process. In another example, graphical images or other non-executable files are excluded from the backup creation process.

This allows for the creation of a mini clone of the organization similar to disaster recovery sites, which can then help with dependencies such as web applications that require database systems inside the isolated network region, in order to discover SQL injection vulnerabilities.

Further, organizational level scanning, allows for the determination of risk of reaching a high-value asset (say, a Web server) via lower-value asset (for example, an employee computer) during a potential security breach. Embodiments can therefore traverse a plurality of production systems and their relationships via associated backups and testing and suggest recommendations of reducing risks.

According to an embodiment, the system 100 further comprises a mounting module 110 configured to mount a copy of the production system 102 on the testing computer 106. Mounting is a process by which a working instance of the production system 100 starts from a copy of the backup files of the production system 100. A mounted copy of the production system 102 replicates the production system 100 from backup files 104.

In an embodiment, the system 100 further comprises a testing module 112. The testing module 112 is a component configured to apply one or more automated tests to the mounted copy of the production system 102 to analyze the production system 102 for vulnerabilities and defects and generate a list of results of execution of each of the predefined tests on the testing computer 106. The list of results is indicative of one or more vulnerabilities or defects that have been detected. In an embodiment, the testing comprises penetration testing.

In an embodiment, the testing module 112 is further configured to collect the generated list of results from each iteration of the testing and store the collected lists in a file or a database. The stored lists of results can be used later, for example, for statistical analysis.

In an embodiment, the testing module 112 is further configured to compare the current generated list of results with the previously stored list of results corresponding to one or more previous backups of the production system 102. By comparing the current and previous lists, the system 100 identifies one or more differences which are indicative of vulnerabilities or defects. The differences, along with suggestions to mitigate the defects or vulnerabilities, are then highlighted and communicated to the users, operators, analysts, or stakeholders. Examples of such results are listings of unpatched services, usage of default credentials, open network ports, vulnerable versions of exposed services, vulnerabilities, and open directory listings.

In an embodiment, the testing module 112 is further configured to track at least one emerging new threat or vulnerability. For example, testing module 112 can communicate with other systems, such as a Common Vulnerability and Exposures (CVE) system. Threat intelligence can therefore be collected from at least one source to identify a new common vulnerability or exposure, for example, as reported by a CVE. In an embodiment, testing module 112 can utilize threat intelligence to revise or modify at least one predefined test for scanning the backup of the production system in a virtual environment. For example, pre-defined tests can be created, edited, removed, or otherwise modified based on the collected threat intelligence.

In an embodiment, the system 100 further comprises a communication module 114 configured to deliver the generated list of results to the users or operators. As the list of results is an indication of the present vulnerabilities or defects, sufficiency of the hardware configuration, or requirement of corrective actions, it is crucial to communicate the result to the users, operators, analyzers, or stakeholders of the system 100. The examples of modes of communication can include an electronic communication, displaying on a display unit of a stakeholder's computer, printing in a print media, or publishing in electronic media.

In an embodiment, the system 100 is fully isolated from wired or wireless networks, such as the Internet or a Local Area Network. In this embodiment, the system 100 is configured to copy the backup files 104 from the production system 102 or generate the backup files 104 of the production system 102 on the testing computer 106 to conduct testing. Once the backup is copied or generated, the interaction of the system 100 with the production system 102 is then restricted or terminated to avoid the inadvertent negative impact that the production system 102 may have if changes are made into the production system 102 during the testing or performing corrective actions.

For example, network ports on the testing computer 106 can be closed and disabled from re-opening. In another example, network adapters on testing computer 106 can be disabled. In an embodiment, a firewall can be utilized to disable the testing computer 106 from network communication. The isolation described herein aligns with zero trust considerations such that each system on its own should be as secure as possible.

In an embodiment, the entire production system 100 or at least one of its components is stopped before the backup is created and re-started after the backup is completed. Accordingly, a complete snapshot of the production system 100 can be captured in such a way that all components of the system are in a stable state, for example, all files have been completely saved.

In an embodiment, described with reference to FIG. 1, a copy 100 of the production system 102 is created using the files comprising the backup of the production system 102. However, in another embodiment, the production system 102 is converted into a container. A container is a unit of software that packages code and its dependencies, so the application runs quickly and reliably across computing environments. Having the production system 102 converted into a container, the testing can be performed on the container without interacting with the real production system 102 by mounting that container in system 100.

In yet another embodiment, the production system 102 is implemented as a web server. A web server is a software component that stores web server software and a website's component files (for example, HTML documents, images, CSS stylesheets, and JavaScript files). The web server accepts requests from the Internet and supports physical data interchange with other devices connected to the web.

In yet another embodiment, the production system 102 is implemented as a scripting engine. A scripting engine is a software component that comprises a computer programming language interpreter, whose function is to interpret the programming text of users, translate such text into machinery code executable by computers, and to complete a series of functions.

Figure 2:
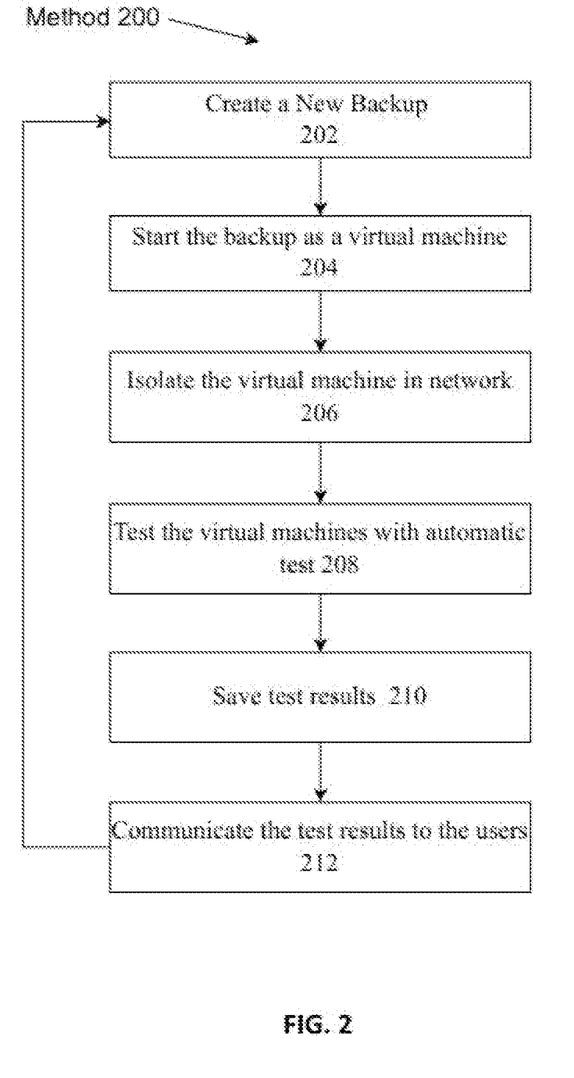
FIG. 2 is a flowchart of a method for verifying functionality of a production system, in accordance with an embodiment.

FIG. 2 is a flowchart of a method for verifying a production system 102 by testing a backup of the production system 102, in accordance with one embodiment. At 202, the backup transporter 108 is configured to generate a new backup of the production system 102. In another embodiment, the backup transporter 108 is implemented by the system 100 to transport the backup generated by the production system 102 and stored at the production system 102 to the storage server of the system 100.

At 204, the mounting module 110 is triggered by the backup generation, and as a result, converts the backup of the real production system 102 into an instance of the system 100. Such instantiation makes the virtual system 100 live. As a result, the backup of system 102 is started as system 100. In an embodiment, the mounting module 110 can listen for system characteristics of a backup generation (e.g. the backup transporter 108 operation) to trigger the mounting module 110 operation. In another embodiment, the mounting module 110 can receive an instruction from the backup transporter 108 to trigger the mounting module 110 operation. Accordingly, in an embodiment, the mounting module 110 is triggered by a completed backup of the system 100. In another embodiment, the mounting module 110 is triggered by a partial backup or update to the system 100

At 206, once a copy of the production system 102 is instantiated as system 100 from the backup of system 102, the system 100 is isolated in the network to terminate any interaction with the real production system 102 to avoid any negative impact that the real production system 102 has due to any changes made during the testing.

At 208, the virtual system 100 is tested by one or more automatic testing scripts of the testing module 112 configured to apply one or more tests or set of rules to the virtual system 100 in order to find out vulnerabilities or defects. In an embodiment, the tests are implemented as automatic pre-configured tests.

At 210, the testing module 112 is further configured to save the results of the performed automated test. In an embodiment, the testing module is further configured to analyze the test results and identify if the corrective action needs to be taken.

At 212, report with the results of the automated test can be communicated to the user, operator, admin, analyst, or stakeholder.

Figure 3:
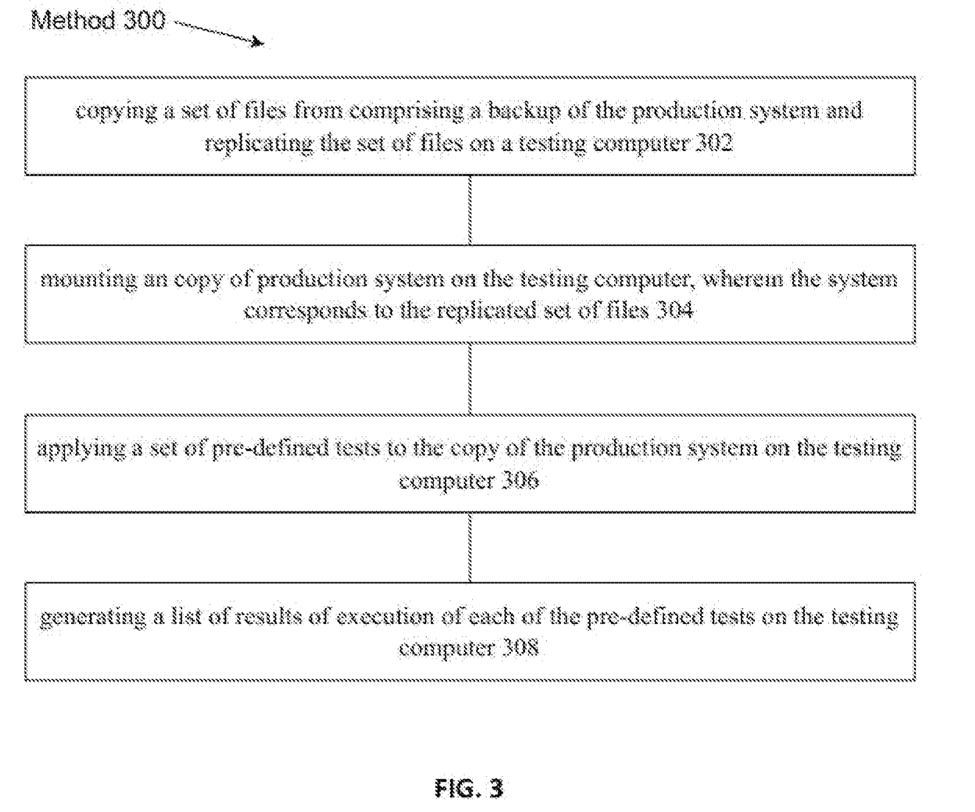
FIG. 3 is a flowchart of a method for verifying a production system by testing a backup of the production system, in accordance with an embodiment.

FIG. 3 is a flowchart of a method for verifying a production system 102 by testing system 100 instantiated from a backup of the production system 102, in accordance with one embodiment. In an embodiment, the production system 102 has one or more projects running, either in planning or execution stage. The production system 102 records each activity related to the projects and generates a backup. At 302, the backup files 104 are copied from the production system 102, and the backup files 104 are replicated on a testing computer 106 on which the system 100 instantiated using these backup files.

In another embodiment, though not depicted in FIG. 1, production system 102 can further comprise a backup generator. In an embodiment, the backup files 104 are generated on the testing computer 106 by the backup generator. In another embodiment, the backup generator is an external software component. In yet another embodiment, the backup generator is a component of the system 100 that has access to the production system 102.

In an embodiment, the backup files of the production system 102 are initially stored on the production system 102 or a location accessible from the production system 102 and later copied or moved to the testing computer 106 or a location accessible by the testing computer 106.

At 304, a copy of the production system 102 is mounted on the testing computer 106. In an embodiment, the backup files 104 represent a copy of the production system 102.

At 306, a set of predefined tests is applied to the copy of the production system 102 on the testing computer 106 to validate the production system 102 and identify if any vulnerabilities or defects are present in the production system 102.

At 308, a list of results of execution of each of the pre-defined tests is generated on the testing computer 106. The result is indicative of the presence of vulnerabilities, defects, insufficient hardware configuration, or a need for corrective actions.

The invention claimed is:

1. A method for verifying a production system by testing a live backup of the production system on a testing computer comprising:
    copying or moving a set of files comprising a backup of the production system and replicating the set of files on a location accessible by the testing computer;
    instantiating a copy of production system on the testing computer to create the live backup, wherein the system corresponds to the set of files comprising the backup of the production system;
    isolating the testing computer to terminate interaction with the production system;
    applying a set of predefined dynamic automatic tests to the live backup on the testing computer;
    generating a list of results of execution of each of the predefined automatic tests on the testing computer;
    saving the list of results on a computer memory or communicating this list to a user; and
    comparing the list of results to a previously stored list of results corresponding to at least one previous backup of the production system; and
    identifying at least one difference in the list of results and the previously stored list of results indicative of a vulnerability based on the comparing.

2. The method of claim 1, further comprising:
    generating the backup of the production system when the production system is live.

3. The method of claim 2, wherein the production system is stopped or paused before generating the backup and the production system is re-started after the backup is completed.

4. The method of claim 1, wherein testing comprises penetration testing.

5. The method of claim 1, further comprising:
    delivering the generated list of results to stakeholders by at least one of:
    sending an electronic communication;
    displaying on a display unit of a stakeholder's computer;
    printing in a print media; or
    publishing in electronic media.

6. The method of claim 1, further comprising:
    collecting the generated list of results from each iteration of the testing and storing the collected lists in a file or a database.

7. The method of claim 1, further comprising:
    performing testing the backup of the production system, wherein the testing the backup of the production system is conducted by an automated testing system having a local testing agent installed onto the computer where a backup of the production system was mounted before the scanning is performed.

8. The method of claim 1, wherein the production system is at least one of: a virtual machine, a container, a scripting engine, or a web server.

9. The method of claim 1, further comprising:
    highlighting and communicating the at least one difference to a user.

10. The method of claim 1, further comprising:
    tracking at least one emerging new threat or vulnerability as detected by threat intelligence collected from at least one source and new common vulnerabilities and exposures reported; and
    revising at least one pre-defined test for scanning the backup of the production system in a testing environment.

11. A system for automatically verifying a production system by testing a live backup copy of the production system, the system comprising:
    a processor;
    memory operably coupled to the processor;
    a backup transporter configured to copy a set of files from the backup of the production system, and replicate the set of files on a testing computer;
    a mounting module configured to instantiate a copy of the production system on the testing computer from the backup files to create the live backup copy and isolate the testing computer to terminate interaction with the production system;
    a testing module configured to:
    apply a set of predefined automatic tests to the mounted set of files on the testing computer to analyze the production system for vulnerabilities detection,
    generate a list of results of execution of each of the predefined automatic tests on the testing computer,
    compare the list of results to a previously stored list of results corresponding to at least one previous backup of the production system, and identify at least one difference in the list of results and the previously stored list of results indicative of a vulnerability based on the comparing.

12. The system of claim 11, further comprising:
a backup system to generate the backup of the production system when the production system is live.

13. The system of claim 11, wherein the production system is at least one of: a virtual machine, a virtual environment, a container, a scripting engine, or a web server.

14. The system of claim 11, further comprising:
a communication module to deliver the generated list of results to stakeholders by at least one of:
sending an electronic communication;
displaying on a display unit of a stakeholder's computer;
printing in a print media; or
publishing in electronic media.

15. The system of claim 11, wherein the system is isolated from a communication network, wherein the communication network includes a wired network or a wireless network.

16. The system of claim 15, wherein the partial filtering is performed based on a set of filtering rules, and wherein the filtering rules are generated by at least one of the following modes:
manually;
through heuristics; or
through Artificial Intelligence or Machine Learning Algorithms based on historical data and data collected from at least one similar system.

17. The system of claim 11, wherein the system is connected with partial filtering, and wherein the system is connected without filters applied on the testing computer.

18. The system of claim 11, wherein the testing module is further configured to collect the generated list of results from each iteration of the testing and store the collected lists for later use.

19. The system of claim 11, wherein the testing module is further configured to:
highlight and communicate the at least one difference to a user.

20. The system of claim 11, wherein the testing module is further configured to:
track at least one emerging new threat or vulnerability as detected by threat intelligence collected from at least one source and new common vulnerabilities and exposures reported; and
revise at least one pre-defined test for scanning the backup of the production system in a virtual environment.

* * * * *